(12) United States Patent
Itoh (10) Patent No.: US 6,253,314 B1
(45) Date of Patent: *Jun. 26, 2001

(54) INSTRUCTION SET AND EXECUTING METHOD OF THE SAME BY MICROCOMPUTER

(75) Inventor: Sakae Itoh, Hyogo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/844,103

(22) Filed: Apr. 28, 1997

Related U.S. Application Data (63) Continuation of application No. 08/395,008, filed on Feb. 27, 1995, now abandoned.

(30) Foreign Application Priority Data

Apr. 6, 1994 (JP) .................................................. 6-068731

(51) Int. Cl.[7] .................................................. G06F 9/306
(52) U.S. Cl. ........................................ 712/226; 712/209
(58) Field of Search ..................................... 712/209, 226

(56) References Cited

U.S. PATENT DOCUMENTS

| | | | | |
|---|---|---|---|---|
| 4,117,536 | * | 9/1978 | Bodner ............................. | 395/536 |
| 4,293,907 | * | 10/1981 | Huang .............................. | 395/384 |
| 4,531,200 | * | 7/1985 | Whitley ............................ | 395/375 |
| 4,649,477 | * | 3/1987 | MacGregor et al. ............... | 395/386 |
| 5,008,807 | * | 4/1991 | Krueger et al. .................. | 395/375 |
| 5,168,571 | * | 12/1992 | Hoover et al. .................... | 395/800 |
| 5,303,358 | * | 4/1994 | Baum ............................... | 395/567 |
| 5,313,601 | * | 5/1994 | Tanaka et al. .................... | 395/400 |
| 5,537,629 | * | 7/1996 | Brown et al. ..................... | 395/375 |

OTHER PUBLICATIONS

J. Dirac, "Call Instruction", IBM Technaical Disclosure Bulletin, vol. 8, No. 12, May 1966.*
A. Tanenbaum, "Structured Computer Organization", 1976 Prentice–Hall pp. 73–79.*

* cited by examiner

Primary Examiner—David Y. Eng
(74) Attorney, Agent, or Firm—McDermott, Will & Emery (57) ABSTRACT

A computer program product, method and apparatus for utilizing common prefix codes in computing instructions so as to reduce the number instructions required to perform identical operations for varying operand sizes. In one form, the common prefix code is appended as the higher order portion of the instruction word to form a second series of instructions. These computing instructions may be utilized in conjunction with a flag register, which, in one application, designates which series of instructions to use; either the original instructions or the modified instructions containing the common prefix. In another application, the flag register designates which register or memory should be used to store the operands and the associated results. Through the use of common prefix codes and the flag register, operands of various sizes can be efficiently manipulated through a simplified scheme of instructions.

16 Claims, 11 Drawing Sheets

| MNEMONIC | INSTRUCTION CODE OF 1st INSTRUCTION SUB-SET (BINARY EXPRESSION) | INSTRUCTION CODE OF 2nd INSTRUCTION SUB-SET (BINARY EXPRESSION) |
|---|---|---|
| ADD | 00000000 | 11111111 00000000 |
| SBB | 00000001 | 11111111 00000001 |
| AND | 00000010 | 11111111 00000010 |
| ⋮ | ⋮ | ⋮ |

※ NOTE : "11111111" CAN NOT USE AS INSTRUCTION CODE OF 1st INSTRUCTION SUB-SET

| MNEMONIC | OPERAND SIZE | INSTRUCTION CODE (BINARY EXPRESSION) |
|---|---|---|
| ADD.B | BYTE(8-BIT LENGTH) | 00000000 |
| ADD.W | WORD(16-BIT LENGTH) | 00000001 |
| SUB.B | BYTE(8-BIT LENGTH) | 00000010 |
| SUB.W | WORD(16-BIT LENGTH) | 00000011 |
| ...... | ...... | ...... |

FIG. 4
PRIOR ART

| MNEMONIC | FLAG REG. | OPERAND SIZE | INSTRUCTION CODE (BINARY EXPRESSION) |
|---|---|---|---|
| ADD | 1 | BYTE (8-BIT LENGTH) | 00000000 |
| | 0 | WORD (16-BIT LENGTH) | |
| SUB | 1 | BYTE (8-BIT LENGTH) | 00000001 |
| | 0 | WORD (16-BIT LENGTH) | |
| ...... | | ...... | ...... |

| MNEMONIC | DESTINATION | INSTRUCTION CODE (BINARY EXPRESSION) |
|---|---|---|
| ADD.1 | 1st SOURCE(REG.) | 00000000 |
| ADD.2 | 2nd SOURCE(MEMORY) | 00000001 |
| SUB.1 | 1st SOURCE(REG.) | 00000010 |
| SUB.2 | 2nd SOURCE(MEMORY) | 00000011 |
| ...... | ...... | ...... |

FIG. 8
PRIOR ART

| MNEMONIC | FLAG REG. | DESTINATION | | INSTRUCTION CODE (BINARY EXPRESSION) |
|---|---|---|---|---|
| ADD | 1 | 1st SOURCE(REG.) | | 00000000 |
|  | 0 | 2nd SOURCE(MEMORY) | | |
| SUB | 1 | 1st SOURCE(REG.) | | 00000001 |
|  | 0 | 2nd SOURCE(MEMORY) | | |
| ...... | | ...... | | ...... |

FIG. 9

| MNEMONIC | INSTRUCTION CODE OF 1st INSTRUCTION SUB-SET (BINARY EXPRESSION) IS1 | INSTRUCTION CODE OF 2nd INSTRUCTION SUB-SET (BINARY EXPRESSION) IS2 |
|---|---|---|
| ADD | 00000000 | 11111111 00000000 |
| SBB | 00000001 | 11111111 00000001 |
| AND | 00000010 | 11111111 00000010 |
| …… | …… | …… |

※ NOTE : "11111111" CAN NOT USE AS INSTRUCTION CODE OF 1st INSTRUCTION SUB-SET

FIG. 10

| FLAG REG. | OPERAND SIZE | |
| --- | --- | --- |
| | 1st INSTRUCTION SUB-SET | 2nd INSTRUCTION SUB-SET |
| 0 | 8 BITS | 16 BITS |
| 1 | 16 BITS | 8 BITS |

FIG. 11

| FLAG REG. | DESTINATION | |
|---|---|---|
| | 1st INSTRUCTION SUB-SET | 2nd INSTRUCTION SUB-SET |
| 0 | 1st SOURCE | 2nd SOURCE |
| 1 | 2nd SOURCE | 1st SOURCE |

INSTRUCTION SET AND EXECUTING METHOD OF THE SAME BY MICROCOMPUTER

This application is a continuation of Application Ser. No. 08/395,008 filed Feb. 27, 1995, now abandoned.

BACKGROUND OF THE INVENTION

1. Field of the Invention

The present invention relates to an instruction set of a microcomputer and an executing method of the same by the microcomputer.

2. Description of the Related Art

As an example of prior arts, an instruction set capable of processing two operand sizes of 8-bit length and 16-bit length, and an executing method of the same by a microcomputer is described in the following.

Figure 1:
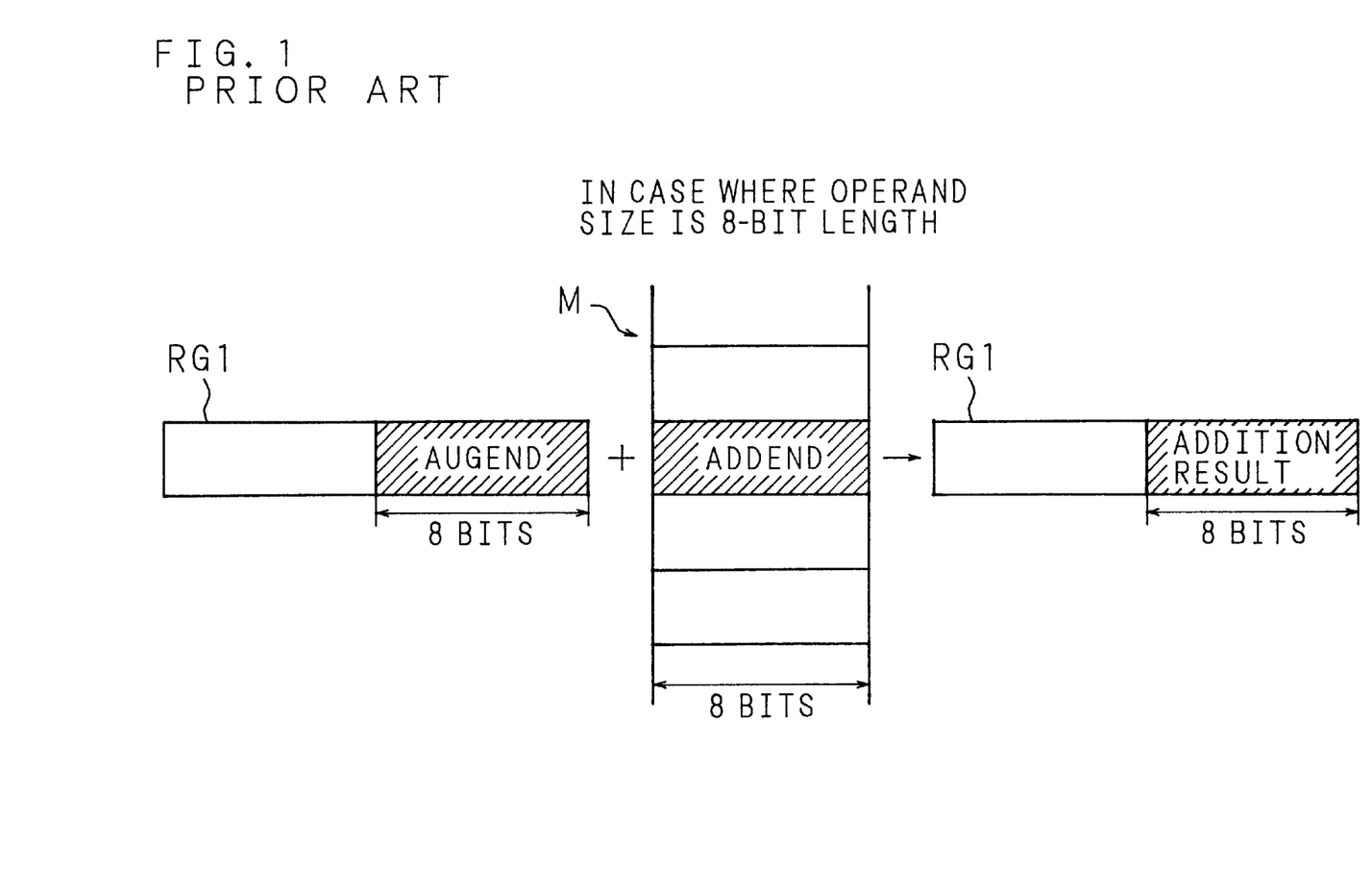
FIG. 1 is a schematic diagram showing a moving state of data in case of adding a content of a register and a content of a memory, when the operand size is 8 bits, by an instruction executed by a microcomputer and storing a result into the original register.
Figure 2:
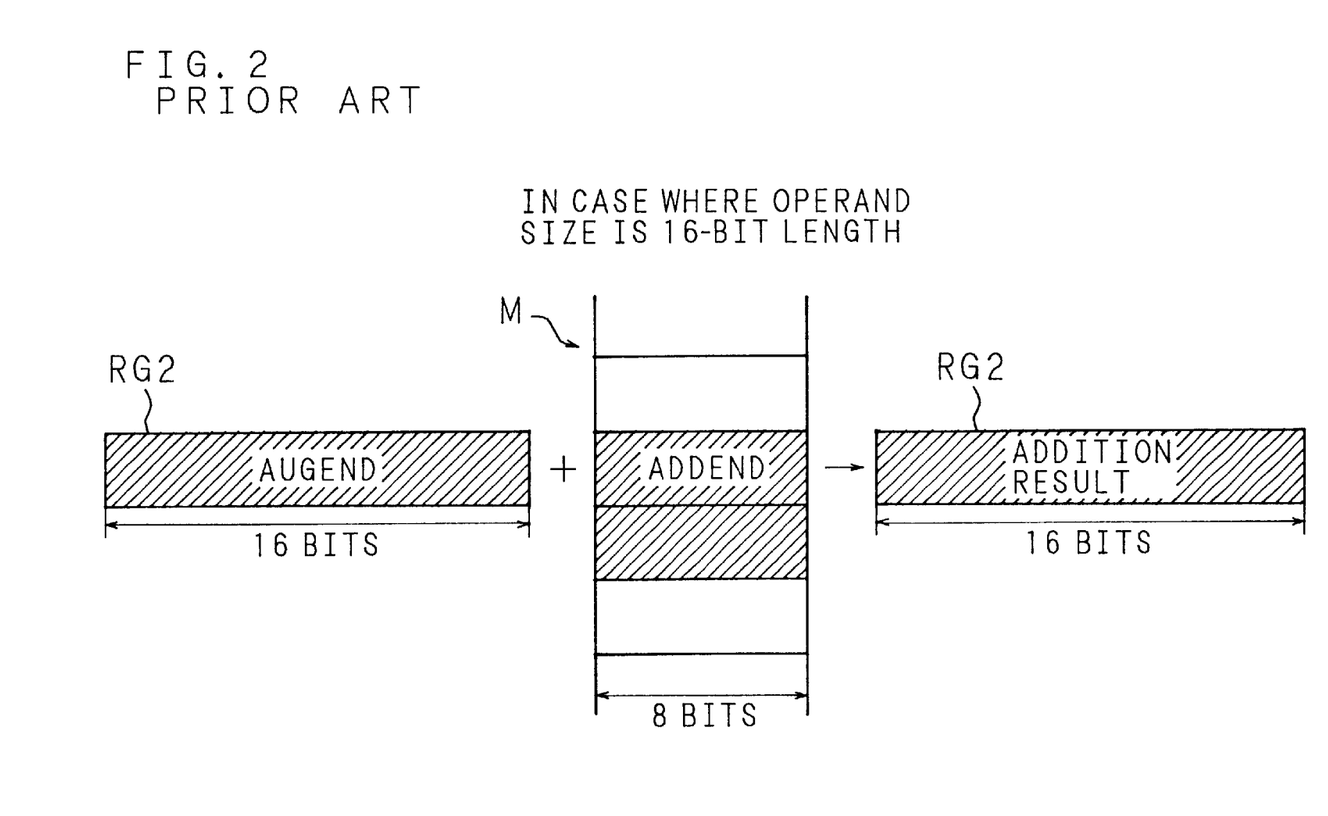
FIG. 2 is a schematic diagram showing a moving state of data in case of adding a content of a register and a content of a memory, when the operand size is 16 bits, by an instruction executed by a microcomputer and storing a result into the original register.

For example, a moving state of data in case of storing a result of content of a register and a content of a memory, which are added by an instruction stored in the microcomputer, into the original register is shown in schematic diagrams of FIG. 1 and FIG. 2. Though each memory address is allocated in a unit of 8 bits in a usual microcomputer, when operands of 16-bit length can be processed, each register has a 16-bit width.

In the case where the operand size is 8-bit, as shown in FIG. 1, an augend consisting of the content of lower 8 bits of a register RG1 of 16-bit length as a first source operand, and an addend consisting of 8-bit data stored in a designated memory address of a memory M as a second source operand are added, and the 8-bit addition result as a destination operand is stored into the lower 8 bits of the register RG1, that is, an original storage of the augend.

Meanwhile, in the case where operand size is 16-bit, as shown in FIG. 2, an augend consisting of the whole content of a register RG2 of 16-bit length, and an addend consisting of a whole of 16-bit data stored in a designated memory address of the memory M and another consecutive memory address are added, and the 16-bit addition result is stored into the entire register RG2, that is, the original storage of the augend.

As such, in case of processing the different operand sizes, for example, in case of processing the 8-bit length or 16-bit length operand size, even the operation is same, instructions corresponding to each occasion are required. In case of executing such instructions by the microcomputer, the following two methods are considered.

A first method is that, different instruction codes, in other words, the instruction codes are allocated uniquely to the instruction operating only the 8-bit length operand and the instruction operating only the 16-bit operand as considering the two as entirely different instructions.

Figure 3:
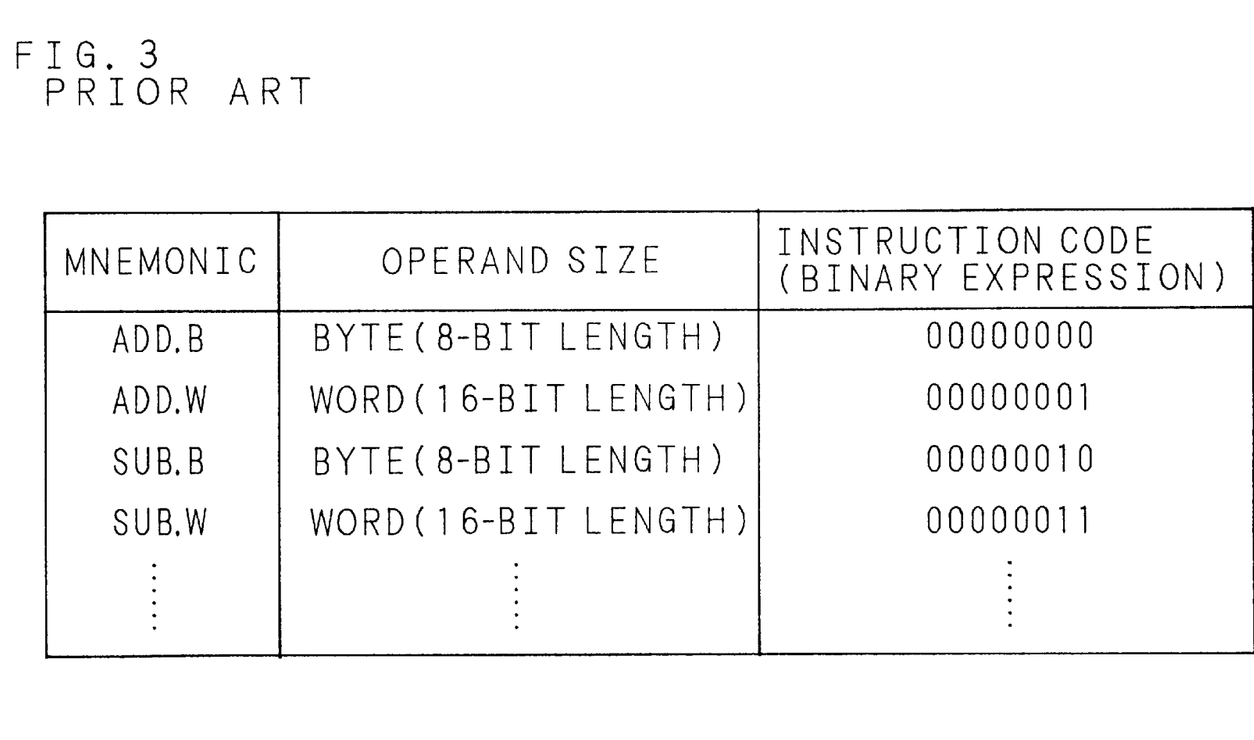
FIG. 3 is a schematic diagram showing an example of conventional instruction set in the where operands having different sizes are operated.

Specifically, as shown in a schematic diagram of an instruction set of FIG. 3, for example, in case of add instruction, for the 8-bit operand, an exclusive add instruction shown by mnemonic "ADD.B", to which "00000000" is allocated, is prepared as the instruction code, and for the 16-bit operand, an exclusive add instruction shown by mnemonic "ADD.W", to which "00000001" is allocated, is prepared as the instruction code.

An end symbol "B" of the mnemonic shows that the operand is a byte size of a 8-bit length, and an end symbol "W" shows that the operand is a word size of a 16-bit length.

In case of subtract instruction, for the 8-bit operand, an exclusive subtract instruction shown by mnemonic "SUB.B", to which "00000010" is allocated, is prepared as the instruction code, and for the 16-bit operand, an exclusive subtract instruction shown by mnemonic "SUB.W", to which "00000011" is allocated, is prepared as the instruction code.

In the first method, for the instructions whose operand sizes are different but basically the operation contents are entirely same, it is necessary to allocate two kinds of instruction codes. Thus, when the instruction code length is, for example, 8-bit length, the instruction code which can be used by 256 at the maximum is divided into half for 8-bit length and 16-bit length, and practically, 128 kinds of instructions can be used. However, when the instruction code is made to be 16-bit length, a more number of instruction codes can be used as compared with the case of 8-bit length. However, in case of lengthening the instruction code length as such, a program size or a data quantity of the program becomes larger, as a result, a memory of the microcomputer for storage requires a large capacity and a processing speed becomes slower, causing a new problem.

A second method is that, only one instruction code is allocated to one operation content, and whether the operand size is 8 bits or 16 bits is instructed by a 1-bit flag register. In this case, when the content of the flag register is "1", the 8-bit length is designated as the operand size for the case executing either of the instructions, and when the content of the flag register is to, the 16-bit length is designated as the operand size for the case executing either of the instructions.

Figure 4:
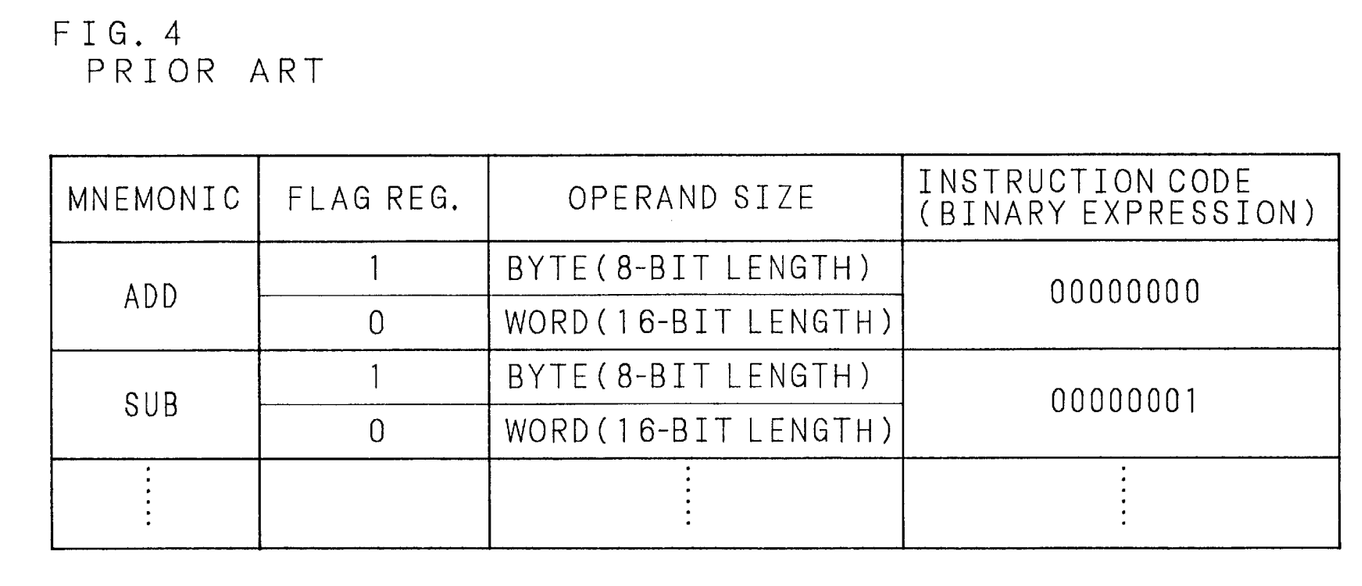
FIG. 4 is a schematic diagram showing another example of conventional instruction set in the case where operands having a different sizes are operated.

Specifically, as shown in a schematic diagram of FIG. 4, for example, in case of add instruction, only the add instruction shown by mnemonic "ADD", to which "00000000" is allocated, is prepared as the instruction code, and the case of processing the 8-bit operand, the content of flag register is set to "1", and in case of processing the 16-bit operand, the content of flag register is set to "0". In case of subtract instruction, only the subtract instruction shown by mnemonic "SUB", to which "00000001", is allocated is prepared as the instruction code, in case of processing the 8-bit operand, the content of the flag register is set to "1", and in case of processing the 16-bit operand, the content of the flag register is set to "0".

In such second method, though the instruction of 256 kinds can be used practically even the instruction code length is 8 bits, the instruction for setting/resetting the flag register to "1" or "0" is required separately. Also, at the time of programming, it is problematic in that, a programmer has to always keep in mind to which value of the flag register is set to make the correct programs.

Figure 5:
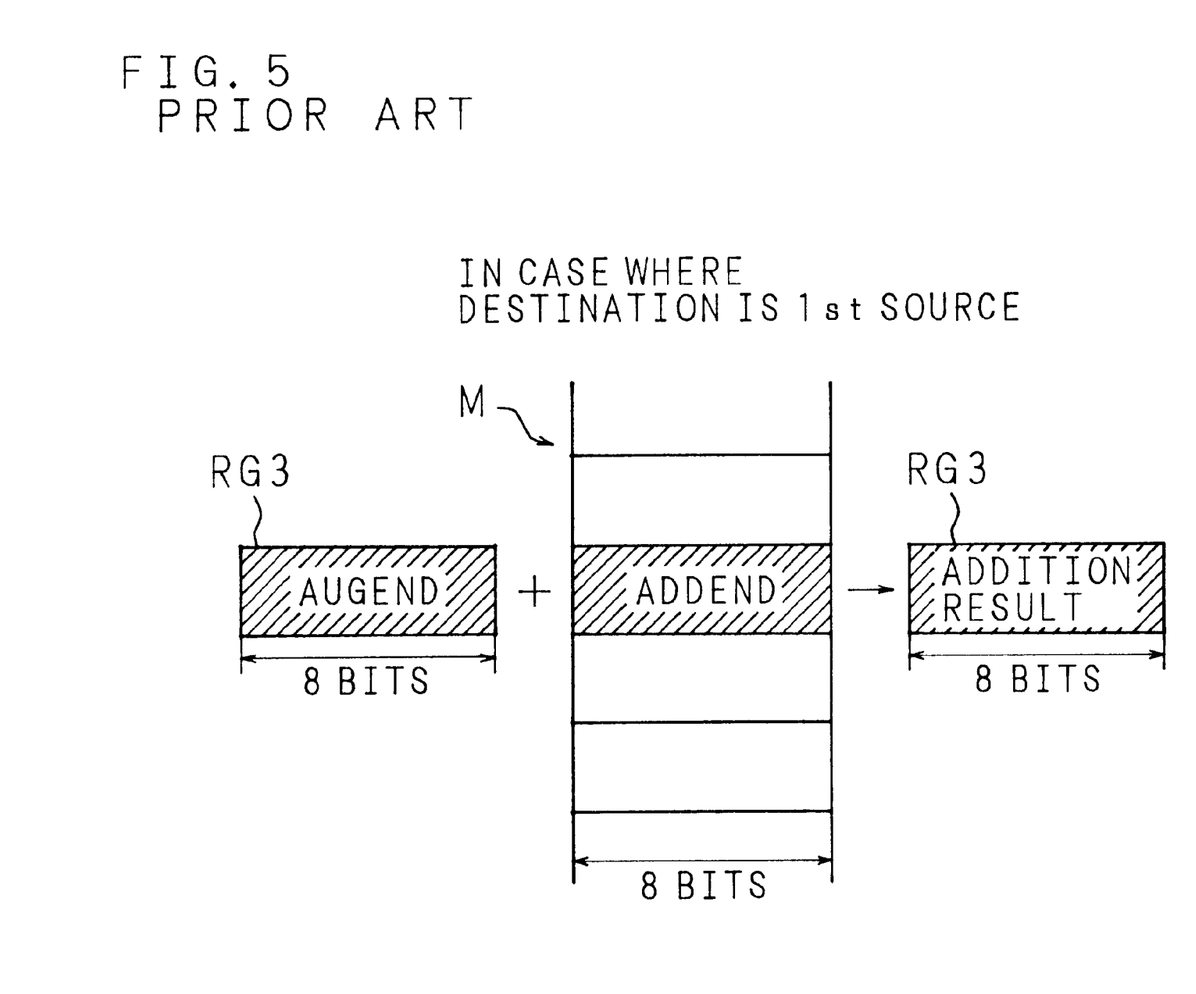
FIG. 5 is a schematic diagram showing a moving state of data in case of adding a content of a register and a content of a memory by an instruction executed by a microcomputer and storing a result into the original register.
Figure 6:
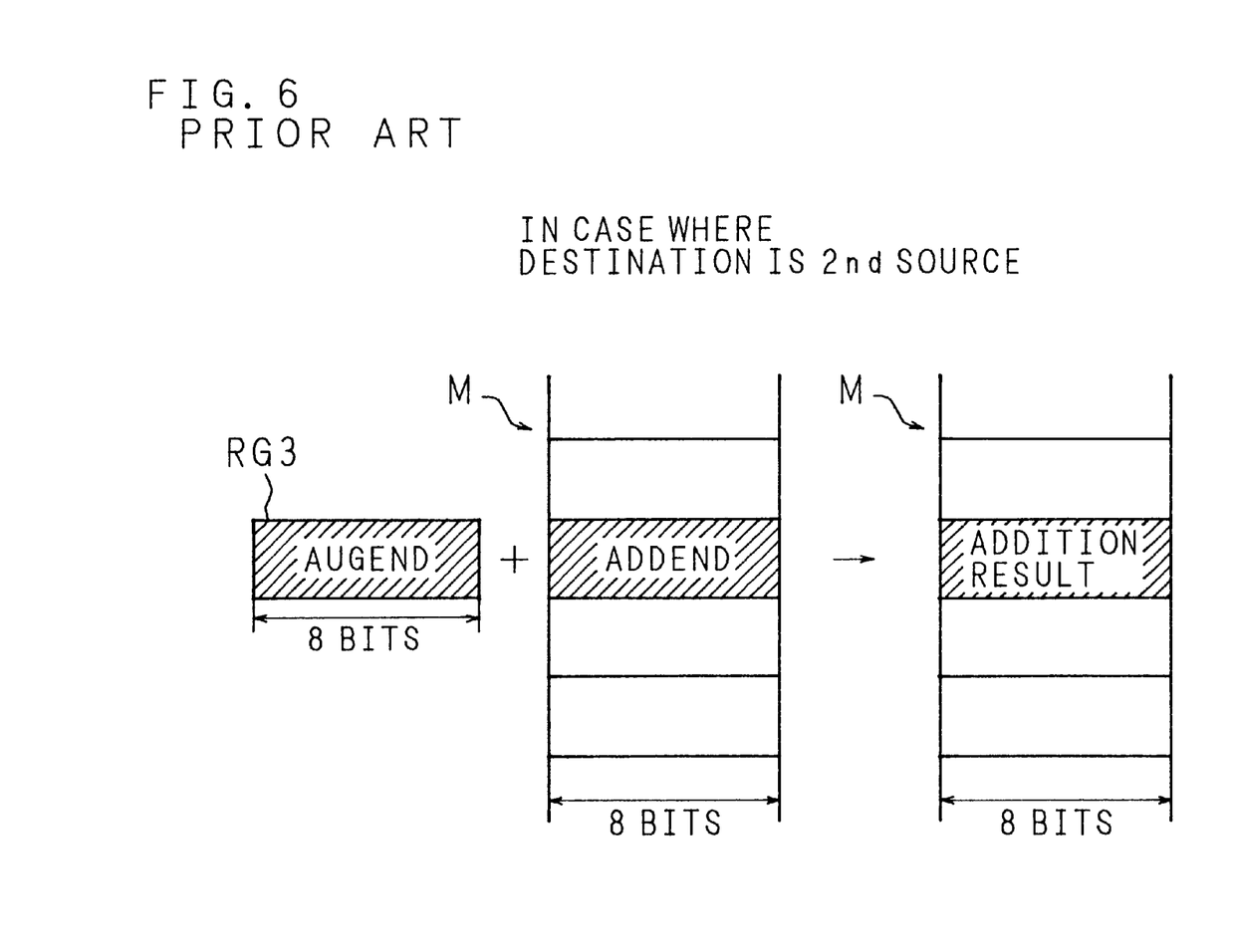
FIG. 6 is a schematic diagram showing a moving state of data in case of adding a content of a register and a content of a memory by an instruction executed by a microcomputer and storing a result into the original memory.

Next, as another example of the prior arts, a moving state of data in case of executing operation, for example, addition to a content of the register and a content of a memory, and storing the result into the original register or the original memory is shown in FIG. 5 and FIG. 6.

In case of storing the operation result into the register, as shown in FIG. 5, an augend consisting of the content of an 8-bit length register RG3 as a first source operand, and an added constituting of 8-bit data stored in designated memory address of a memory M as a second source operand are added, and the 8-bit addition result as a destination operand is stored into the register RG3, that is, the original storage (the first source operand) of the augend.

Meanwhile, in case of storing the operation result into the memory, as shown in FIG. 6, an augend consisting of the content of the register RG3 as the first source operand, and an addend consisting of 8-bit data stored in the designated memory address of the memory M as the second source operand are added, and the 8-bit addition result as the destination operand is stored into the memory M, that is, the original storage (the second source operand) of the addend.

As such, in case of processing the different storing destinations of the operation result, that is, the destination by even the same operation, for example, when processing either the case where the destination as aforementioned is the register as the first source operand, or the case where it is the memory as the second source operand, the instructions corresponding to each case are required. And, in case of executing a plurality of such instructions by the microcomputer, the following two methods can be considered.

One method is that, as considering an instruction whose destination operand is the first source operand, and an instruction whose destination operand is the second source operand as the entirely different instructions, the instruction code is allocated to each uniquely.

Figure 7:
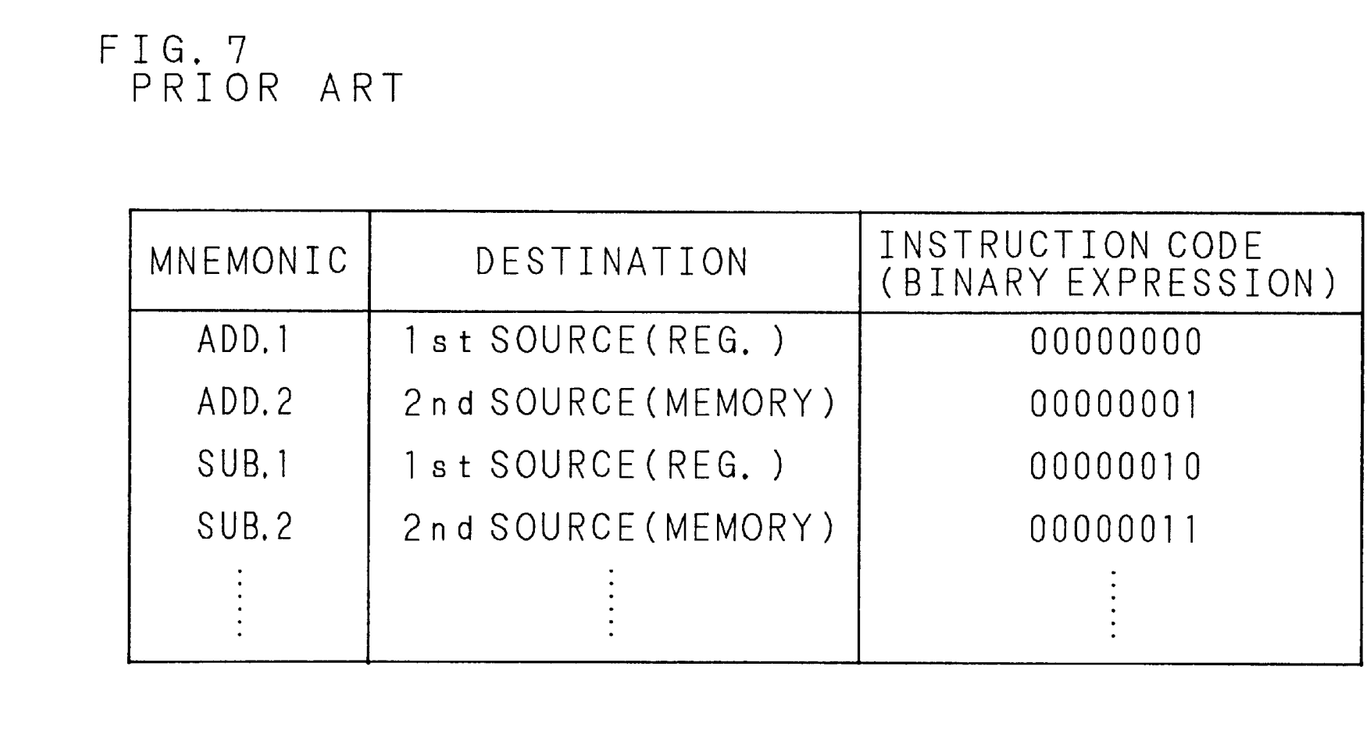
FIG. 7 is a schematic diagram showing an example of conventional instruction set in case of adding a content of a register and a content of a memory and storing a result into the original register.

Specifically, as shown in a schematic diagram of FIG. 7, for example, in the add instruction, an exclusive add instruction shown by mnemonic "ADD.1", to which "00000000" is allocated, is prepared as the instruction code for the instruction whose destination is the first source (register), and for the instruction whose destination is the second source (register), an exclusive add instruction shown by mnemonic "ADD.2", to which "00000001" is allocated, is prepared as the instruction code.

And end numeral "1" of the mnemonic shows that the destination is the first source or the register, and an end numeral "2" of the mnemonic shows that the destination is the second source or the memory.

In the subtract instruction, an exclusive subtract instruction shown by mnemonic "SUB.1", to which "00000010" is allocated, is prepared as the instruction code for the instruction whose destination is the first source, and for the instruction whose destination is the second source, an exclusive subtract instruction shown by mnemonic "SUB.2", to which "00000011" is allocated, is prepared as the instruction code.

In the first method, for the instruction whose destinations are different but basically the operation contents are entirely same, it is necessary to allocate two kinds of instruction codes, thus the same problem as the aforementioned first method in case of different operand sizes is encountered.

The second method is that, only one instruction code is allocated to one operation contents, and whether the destination is the first source or the second source is instructed by a 1-bit flag register. In this case, for example, when the content of the flag register is "1", the first source is designated as the destination for the case executing either of the instructions having two operand sources, and when the content of the flag register is "0", the second source is designated as the destination for the case executing either of the instructions.

Figure 8:
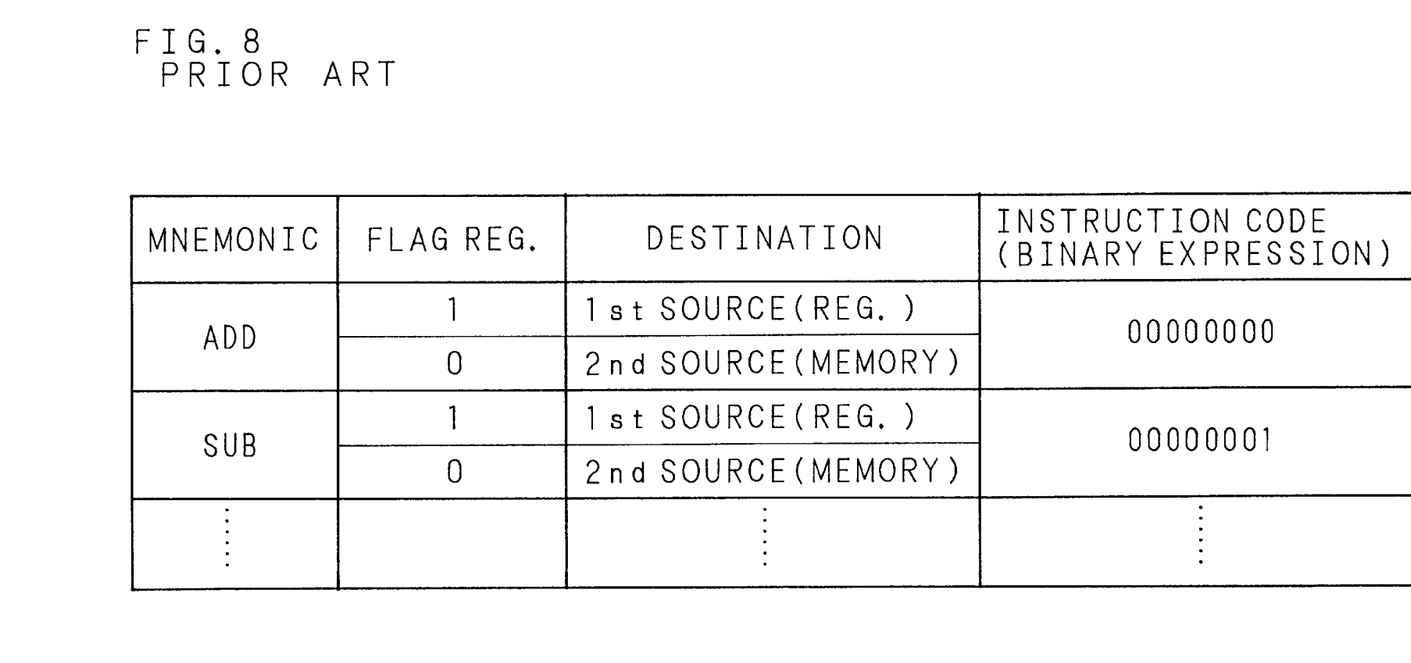
FIG. 8 is a schematic diagram showing an example of conventional instruction set in case of adding a content of a register and a content of a memory and storing a result into the original memory.

Specifically, as shown in a schematic diagram of FIG. 8, for example, in the add instruction, only the add instruction shown by the mnemonic "ADD", to which "00000000" is allocated, is prepared as the instruction code, and in case of processing the instruction whose destination is the first source, the content of the flag register is set to "0", and in case of processing the instruction whose destination is the second source, the content of the flag register is set to "0". Also, in the subtract instruction, only the subtract instruction shown by the mnemonic "SUB", to which "00000001" is allocated, is prepared as the instruction code, and when processing the instruction whose destination is the first source, the content of the flag register is set to "1", and when processing the instruction whose destination is the second source, the content of the flag register is set to "0".

In such second method, though practically the instructions of 256 kinds can be used even when the instruction code length is 8 bits, the same problem as the case of aforementioned second method where the operand sizes are different is encountered.

As such, in the conventional instruction set of the microcomputer, in case of plural operand sizes when executing the practically same operations, or in case of plural operand sizes when executing of the operation result, the instructions corresponding to either cases were prepared or either of the instructions is selected by a set value of the flag register. And hence, in the former, the number of instructions which can be used practically reduces to one half of less as compared with the number of instructions which can be set, and in the latter, a burden of an programmer is heavy at programming.

The present invention has been devised in diagram of such circumstances, therefore, it is an object thereof to provide an instruction set and an executing method of the same by a microcomputer, whereby the number of instructions which can be used is made practically same as the number of instructions which can be set, both for the case where operand sizes of the instructions to be operated are plural, and the case where the number of storages of the operation result is plural, thus the burden of the programmer at programming can be lessened.

SUMMARY OF THE INVENTION

A first aspect of the present invention of the instruction set comprises, a plurality of instruction sets including, a basic instruction set constituted by a plurality of instructions to which codes are allocated uniquely for executing respective predetermined operations for an operand of a certain size, and a second instruction set constituted by a plurality of instructions to which codes of instructions for executing the same operation of the basic instruction set are allocated respectively as the lower codes, and a common prefix code is respectively added as a higher code.

A second aspect of the present invention of the instruction set comprises, a first instruction set constituted by a plurality of instructions to which codes are allocated uniquely for executing respective predetermined operations for the operand of a certain size, and a second instruction set constituted by a plurality of instructions to which codes of instructions for executing the same operation of the first instruction set are allocated respectively as the lower codes, and a common prefix code is respectively added as a higher code.

A third aspect of the present invention of the instruction set comprises, a first instruction set constituted by a plurality of instructions to which codes are respectively allocated uniquely for executing respective predetermined operations between data stored in a first data storage and data stored in a second data storage to store the operation result into the first or second storage, and a second instruction set constituted by a plurality of instructions to which codes of instruction for executing the same operation of the first instruction set are allocated respectively as the lower code, and a common prefix code is added respectively as a higher code.

A first aspect of an executing method of the instruction set by a microcomputer of the present invention, when executing a plurality of instructions for operating the operands of a plurality of sizes, executes the instructions such that the aforementioned instruction sets of the first aspect of the instruction set respectively operate the operands of the different sizes responsive to the content of a flag register which is provided in the microcomputer and whose content can be set optionally, presence or absence of the prefix code and the content of the added prefix codes.

A second aspect of an executing method of the instruction set by a microcomputer of the present invention, when executing a plurality of instructions for operating the operands of a plurality of sizes, executes the instructions of the aforementioned first and second instruction sets of the second aspect of the instruction set such that, when the content of a 1-bit flag register which is provided in the microcomputer and whose content can be set optionally is in a first state, the instructions of the first instruction set operate the operands of the first size, and the instructions of the second instruction set operate the operands of the second size, and when the content of the flag register is in a second state, the instructions of the first instruction set operate the operands of the second size, and the instructions of the second instruction set operate the operands of the first size.

A third aspect of an executing method of the instruction set by a microcomputer of the present invention, when executing a plurality of instructions which execute the operation between data stored in the first data storage and data stored in the second data storage to store the operation result into the first or second storage, executes the instruction of the aforementioned first and second instruction sets of the second aspect of the instruction set such that, when the content of a 1-bit flag register which is provided in the microcomputer and whose content can be set optionally is in a first state, the instructions of the first instruction set store the operation result into the first storage, and instructions of the second instruction set store the operation result into the second storage, and when the content of the flag register is in a second state, the instructions of the first instruction set store the operation result into the second storage, and the instructions of the second instruction set store the operation result into the first storage.

In the first aspect of the present invention of the instruction set, in the respective instruction sets except the basic instruction set, the instruction having the same lower code as the instruction codes of the basic instruction set executes the same operation for the operands whose size are different from the size of the basic instruction set.

In the second aspect of the present invention of the instruction set, in the second instruction set, the instruction having the same lower code as the instruction codes of the first instruction set executes the same operation for the operands whose size are different from the size of the first instruction set.

In the third aspect of the present invention of the instruction set, in the second instruction set, the instruction having the same lower code as the instruction codes of the first instruction set executes the same operation, and stores the operation result into the second storage when the instructions of the first instruction set store it into the first data storage, and stores the operation result into the first storage when the instructions of the first instruction set store it into the second data storage.

In the first aspect of the executing method of the instruction by the microcomputer of the present invention, responsive to the content of the flag register, presence or absence of the prefix code and the content of the added prefix code, the instructions having the same lower code of each instruction sets execute the same operation for the operands of different sizes.

In the second aspect of the executing method of the instruction set by the microcomputer of the present invention, responsive to the content of the flag register and the content of the prefix code, the instructions having the same lower code of the first and second instruction sets execute the same operation for the operands of different sizes.

In the third aspect of the executing method of the instruction set by the microcomputer of the present invention, responsive to the content of the flag register and the content of the prefix code, the instructions having the same lower code of the first and second instruction sets execute the same operation between data stored in the first data storage and data stored in the second data storage to store the operation result into the respective different data storages.

The above and further objects and features of the invention will more fully be apparent from the following detailed description with accompanying drawings.

DESCRIPTION OF THE PREFERRED EMBODIMENTS

In the following, the present invention is particularly described based on the drawings showing its embodiments.

Figure 9:
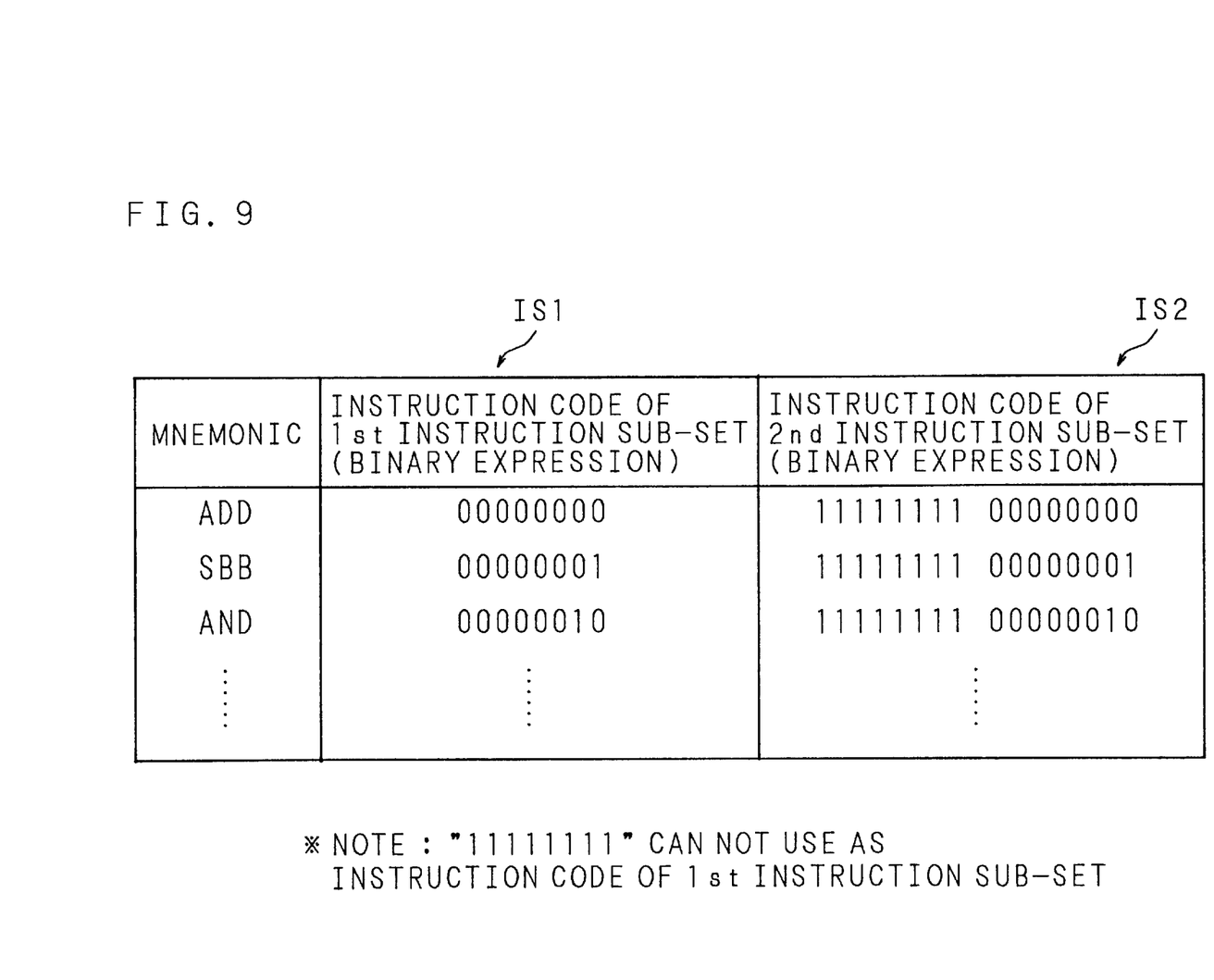
FIG. 9 is a schematic diagram showing instruction codes allocated to instructions of the instruction set of the present invention.

FIG. 9 is a schematic diagram showing instruction codes allocated to instructions of an instruction set of the present invention.

In the instruction set of the present invention, in case of processing operands of two sizes such as an 8-bit operand and a 16-bit operand, two sets of instruction subsets are prepared. Specifically, in this embodiment, a first instruction sub-set as a basic instruction set shown by an reference character IS1 and a second instruction subset shown by a reference character IS2 in FIG. 9 are prepared.

The first instruction sub-set IS1 is allocated with one instruction code for one operation. In the first instruction sub-set IS1, since the instruction code is of 8-bit length, the instructions of 256 kinds can be stored in a microcomputer for execution at the maximum.

Also, the instruction codes of the second instruction sub-set IS2 are constituted by adding a suitable prefix of 8-bit length, for example, "11111111" to the instruction codes of the first instruction sub-set IS1. Thus, the instruction codes of the second instruction sub-set IS2 are 16-bit long.

However, a code used as the prefix of the second instruction sub-set IS2 can not be used as the instruction code of the first instruction sub-set IS1. Specifically, since "11111111" is used as the prefix of the second instruction sub-set IS2 in this embodiment, "11111111" can not be used as the instruction code of the first instruction sub-set IS1.

Figure 10:
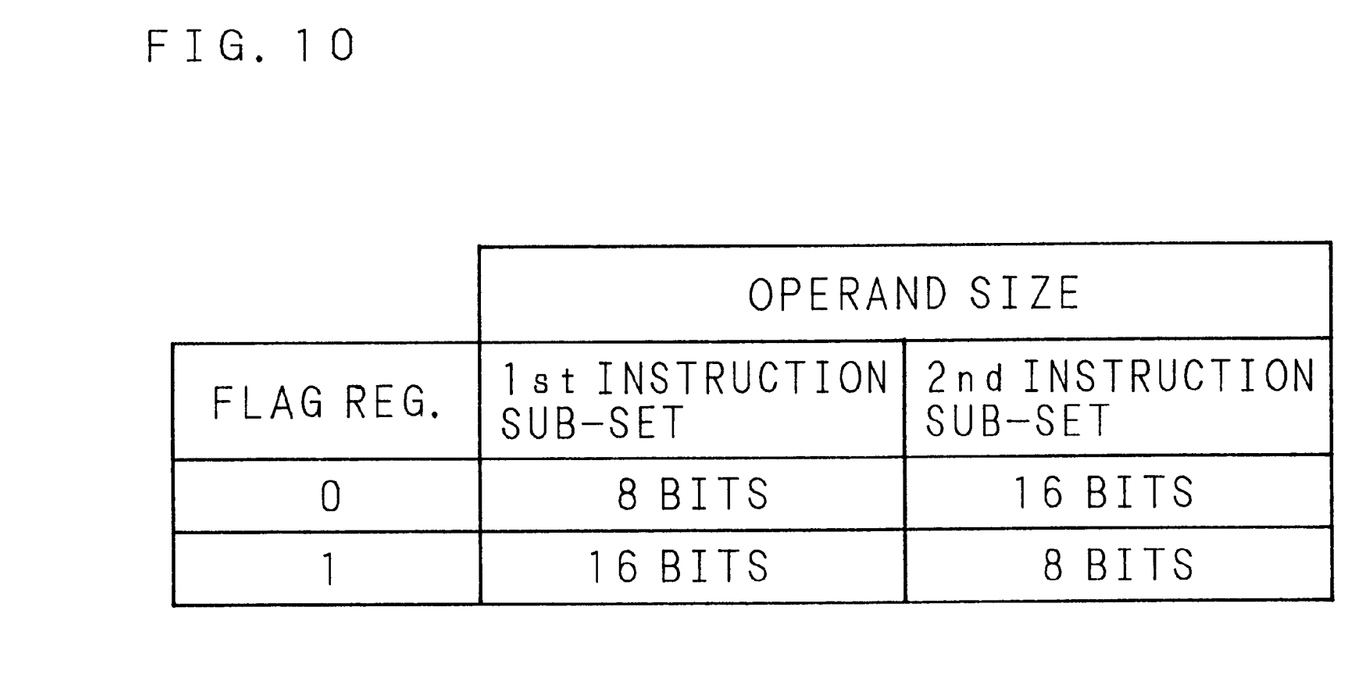
FIG. 10 is a schematic diagram showing the relationship between a content of a flag register and an operand size operated by the instruction sets of a first embodiment of an executing method of an instruction set by a microcomputer of the present invention.

Furthermore, as a first embodiment of an executing method of the instruction set as aforementioned by a microcomputer, a 1-bit flag register is used. And, as shown in FIG. 10, when a content of the flag register is "0", the operand size of the instructions of the fist instruction subset IS1 is processed as an 8-bit length, and simultaneously, the operand size of the instructions of the second instruction sub-set IS2 is processed as a 16-bit length.

Meanwhile, when the content of the flag register is "1", in opposite to the above-mentioned, the operand size of the instructions of the first instruction sub-set IS1 is processed as the 16-bit length, and simultaneously, the operand size of the instructions of the second instruction sub-set IS2 is processed as the 8-bit length.

Thus, when the operand size used in the program made by a programmer is mainly 8 bits, the programmer executes programming in the beginning of the program so that the content of the flag register is set to "0". Thereafter, the program is made by using mainly the first instruction sub-set IS1 whose instruction codes are constituted by 8 bits, and only when the instruction using the operand size of 16-bit length is required, the program is made by using mainly the instruction of the second instruction sub-set IS2.

Meanwhile, when the operand size used in the program is mainly 16 bits, the programmer executes programming in the beginning of the program so that the content of the flag register is set to "1". Thereafter, the program is made by using the first instruction sub-set IS1 whose instruction codes are constituted mainly by 8 bits, and only when the instruction using the operand size of 8-bit length is required, the programming is executed by using the instruction of the second instruction sub-set IS2.

As such, when the operand size used in the program is mainly 8 bits, the flag register is set to "0", and when 16 bits, the flag register is set to "1", whereby, in either cases, the program can be made by using mainly the first instruction sub-set IS1 constituted by the instruction code of 8-bit length. Thus, since the instruction code of 16-bit length of the second instruction sub-set IS2 is not used completely, or the frequency of use is very low, the program size can be reduced, and the execution speed of the instruction is increased. Furthermore, the content of the flag register need not be changed during execution of the program.

In the above-mentioned first embodiment of the executing method of the instruction set by the microcomputer of the present invention, though the instruction set comprises, the first instruction sub-set IS1 as the basic instruction set, and the second instruction sub-set IS2 constituted by the instruction having 16-bit code obtained by adding 8-bit prefix code "11111111" to 8-bit code of the instructions of the first instruction sub-set IS1, the common lower code length of the instruction sets, in other words, the code length of the first instruction sub-set IS1 is not restricted to 8 bits. Also, the prefix code is not restricted to "11111111" or to 8 bits, but it is desirable to have the same number of bits as the code length of the basic instruction set.

Also, by adding the different prefix code to the instruction codes of the first instruction sub-set IS1, it is naturally possible to include several instruction sub-sets besides the first instruction sub-set IS1 and the second instruction sub-set IS2, and to operate the operands of different sizes by the instruction sub-sets respectively. Even in such cases, from an object of the present invention, it is desirable to constitute the instruction codes of the basic first instruction sub-set IS1 with 8 bits, and to operate the operand size used most frequently by the first instruction sub-set IS1.

Next, a second embodiment of the executing method of the instruction set by the microcomputer of the present invention is described based on the drawings.

Figure 11:
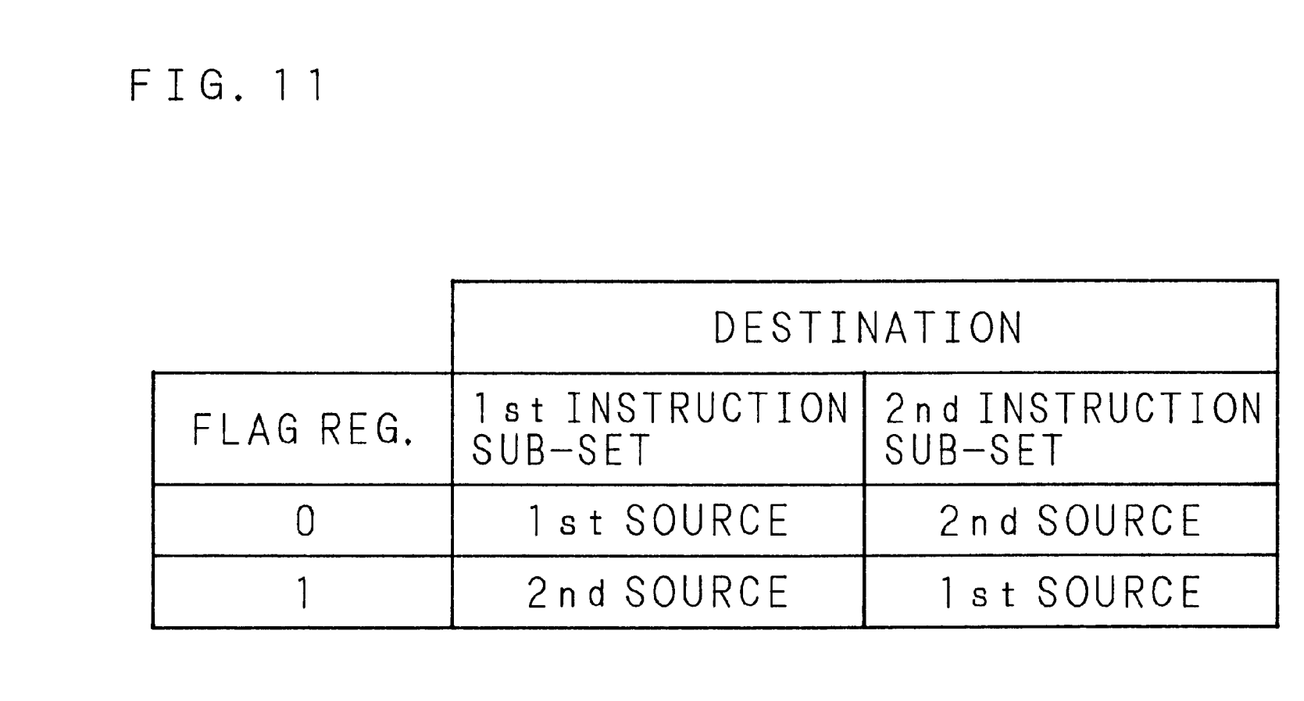
FIG. 11 is a schematic diagram showing a relationship between a content of a flag register and a storage of an operation result by instruction sets of a second embodiment of an executing method of an instruction set by a microcomputer of the present invention.

Hereupon, as shown in FIG. 11, as the second embodiment of the executing method of the first instruction sub-set IS1 consisting of the 8-bit instruction code and the second instruction sub-set IS2 consisting of the 16-bit instruction code shown in FIG. 9 by the microcomputer, when the content of the flag register is "0", destination operands of the instructions of the first instruction sub-set IS1, that is, the storages of the operation result are processed as a first source, and simultaneously, destination operands of the instructions of the second instruction sub-set IS2 are processed as a second source.

Meanwhile, when the content of the flag register is "1", in opposite to the above-mentioned, the instruction destination operands of the fist instruction sub-set IS1 are processed as a second source, and simultaneously, the instruction destination operands of the second instruction sub-set IS2 are processed as the first source.

Thus, the programmer executes the programming in the beginning of the program so that, the content of the flag register is set to "0", when the destinations of the operands used in the program made by himself are mainly the first source. And thereafter, the program is made by using mainly the first instruction sub-set IS1 whose instruction codes are constituted by 8 bits, and only when the instruction whose destination operand is the second source is required, the programming is executed by using the instruction of the second instruction sub-set IS2.

Meanwhile, the programmer executes the programming in the beginning of the program, so that the content of the flag register is set to "1", when the destinations of the operands used in the program are mainly the second source. And thereafter, the program is made by using mainly the first instruction sub-set IS1 whose instruction codes are constituted by 8 bits, and only when the instruction whose destination operand is the first source is required, the program is made by using the instruction of the second instruction sub-set IS2.

As such, when the destination operands of the instructions mainly used in the program is the first source, the flag register is set to "0", and when the second source, the flag register is set to "1", thereby, in either cases, the program can be made by using mainly the first instruction sub-set IS1 constituted by the instruction code of 8-bit length. Thus, since the instruction code of 16-bit length of the second instruction sub-set IS2 is not used completely or the frequency of use is very low, the program size can be reduced and the instruction executing speed can be increased. Furthermore, the content of the flag register need not be changed during execution of the program.

In the aforementioned second embodiment of the executing method of the instruction set by the microcomputer of the present invention, the instruction set comprises, the first instruction sub-set IS1 as the basic instruction set, and the second instruction sub-set IS2 constituted by the instruction having the 16-bit code obtained by adding 8-bit prefix code "11111111" to 8-bit code of the instructions of the first instruction set IS1, but the common lower code length of the instruction sets, in other words, the code length of the first instruction sub-set IS1 is not restricted to 8 bits. Also, the prefix code is not restricted to "11111111" or 8 bits, but is desirable to have the same number of bits as the code length of the basic instruction set.

As particularly described heretofore, according to the present invention, the instruction set and the executing method of the same by the microcomputer which is capable of, when the operand sizes of the instructions to be operated are plural, making the number of instructions which can be used and the number of instructions which can be set practically equal, and lessening the burden of the programmer at programming, is realized.

Also, according to the present invention, the instruction set and the executing method of the same by the microcomputer which is capable of, when the storages of the operation result of the instructions are plural, making the number of instructions which can be used and the number of instructions which can be set practically equal, and lessening the burden of the programmer at programming, is realized.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalents of such meets and bounds thereof are therefore intended to be embraced by the claims.

What is claimed is:

1. A computer-implemented data processing method for a microcomputer having a flag register, comprising the steps of:

loading a first instruction code belonging to a first instruction subset, the first instruction code specifying an operation on an operand of a first size;

loading a second instruction code belonging to a second instruction subset, said second instruction code comprising a common prefix code appended to the first instruction code belonging to the first instruction subset as one of a higher order and lower order portion of the second instruction code, said second instruction code belonging to the second instruction subset specifying the operation on another operand of a second size, other than the first size; and executing the first instruction code belonging to the first instruction subset or the second instruction code belonging to the second instruction subset to perform the operation upon an operand of the first size or the second size selectively based upon a content of the flag register and presence or absence of the common prefix code.

2. The method as set forth in claim 1, wherein:

a number of bits of first instruction code belonging to said first instruction subset and of said common prefix code are the same, and a number of bits of the second instruction code belonging to the second instruction subset is a sum of the number of bits of the first instruction code belonging to the first instruction subset and the number of bits of the common prefix code.

3. The method as set forth in claim 2, wherein:

a number of bits of the first instruction code belonging to said first instruction subset and of the second instruction code belonging to said second instruction subset are 8 bits and 16 bits, respectively, and said common prefix code is "11111111".

4. A computer-implemented data processing method, comprising the steps of:

loading a first instruction code belonging to a first instruction subset, the instruction code specifying an operation on an operand of a first size;

loading a second instruction code belonging to a second instruction subset, said second instruction code comprising a common prefix code appended to the first instruction code belonging to the first instruction subset as one of a higher order and lower order portion of the second instruction code, said second instruction code belonging to the second instruction subset specifying the operation on another operand of a second size, other than the first size; and setting a flag register to be in one state or in another state; and executing the first instruction code belonging to the first instruction subset or the second instruction code belonging to the second instruction subset selectively by:

when the flag register is in the one state, executing the first instruction code to perform the operation on an operand of the first size and executing the second instruction code to perform the operation on an operand of the second size, and when the flag register is in the another state, executing the first instruction code to perform the operation on an operand of the second size and executing the second instruction code to perform the operation on an operand of the first size.

5. The method as set forth in claim 4, wherein:

a number of bits of first instruction code belonging to said first instruction subset and of said common prefix code are the same, and a number of bits of the second instruction code belonging to the second instruction subset is a sum of the number of bits of the first instruction code belonging to the first instruction subset and the number of bits of the common prefix code.

6. The method as set forth in claim 5 wherein:

a number of bits of the first instruction code belonging to said first instruction subset and of the second instruction code belonging to said second instruction subset are 8 bits and 16 bits, respectively, and said common prefix code is "11111111".

7. A computer-implemented data processing method for a microcomputer having a flag register, comprising the steps of: loading a first instruction code belonging to a first instruction subset the first instruction code specifying an operation between data stored in a first data storage and data stored in a second data storage to store an operation result into said first or second data storage;

loading a second instruction code belonging to a second instruction subset, said second instruction code comprising a prefix code added to the first instruction code belonging to the first instruction subset as one of a higher order and lower order portion of the second instruction code, said second instruction code belonging to the second instruction subset specifying the operation between data stored in a first data storage and data stored in a second data storage to store an operation result into said first or second data storage; and executing the first instruction code belonging to the first instruction subset or the second instruction code belonging to the second instruction selectively to store the operation result in the first or second data storage based upon a content of the flag register and presence or absence of the prefix code.

8. The method as set forth in claim 7, wherein:

a number of bits of first instruction code belonging to said first instruction subset and of said common prefix code are the same, and a number of bits of the second instruction code belonging to the second instruction subset is a sum of the number of bits of the first instruction code belonging to the first instruction subset and the number of bits of the common prefix code.

9. The method as set forth in claim 8, wherein:

a number of bits of the first instruction code belonging to said first instruction subset and of the second instruction code belonging to said second instruction subset are 8 bits and 16 bits, respectively, and said common prefix code is "11111111".

10. A computer-implemented data processing method, comprising the steps of:

loading a first instruction code belonging to a first instruction subset, the first instruction code specifying an operation between data stored in a first data storage and data stored in a second data storage to store an operation result into said first or second data storage;

loading a second instruction code belonging to a second instruction subset, said second instruction code comprising a prefix code added to the first instruction code belonging to the first instruction subset as one of a higher order and lower order portion of the second instruction code, said second instruction code belonging to the second instruction subset specifying the operation between data stored in a first data storage and data stored in a second data storage to store an operation result into said first or second data storage; and setting a flag register to be in one state or in a second state; and executing the first instruction code belonging to the first instruction subset or the second instruction code belonging to the second instruction subset selectively by:

when the flag register is in the one state, executing the first instruction code to perform the operation to store the operation result into the first storage and executing the second instruction code to store the operation result into the second storage, and when the flag register is in the second state, executing the first instruction code to perform the operation to store the operation result into the second storage and executing the second instruction code to store the operation result into the first storage.

11. The method as set forth in claim 10, wherein:

a number of bits of first instruction code belonging to said first instruction subset and of said common prefix code are the same, and a number of bits of the second instruction code belonging to the second instruction subset is a sum of the number of bits of the first instruction code belonging to the first instruction subset and the number of bits of the common prefix code.

12. The method as set forth in claim 11 wherein:

a number of bits of the first instruction code belonging to said first instruction subset and of the second instruction code belonging to said second instruction subset are 8 bits and 16 bits, respectively, and said common prefix code is "11111111".

13. A method of executing instructions, comprising:

fetching a first instruction code;

reading a flag bit from a register, said flag bit having either a first value or a second value;

determining whether or not the first instruction code is a predetermined prefix code;

if said determining indicates that the first instruction code is not the predetermined prefix code, then processing the first instruction code to selectively execute either a first operation or a second operation based on whether the flag bit has the first value or the second value, respectively; and if said determining indicates that the first instruction code is the predetermined prefix code, then fetching a second instruction code and processing the second instruction code to selectively execute either the second operation or the first operation based on whether the flag bit has the first value or the second value, respectively.

14. The method of claim 13, wherein:

executing the first operation includes executing an operation on an operand of a first size;

executing the second operation includes executing the operation on an operand of a second size, said second size being greater than the first size.

15. The method of claim 14, wherein the first size is eight bits and the second size is sixteen bits.

16. The method of claim 13, wherein:

executing the first operation includes executing an operation using a register source; and executing the second operation includes executing the operation using a memory source.

* * * * *